United States Patent
Ericson et al.

(10) Patent No.: US 8,838,130 B2
(45) Date of Patent: Sep. 16, 2014

(54) METHOD AND ARRANGEMENT IN A WIRELESS COMMUNICATION SYSTEM

(75) Inventors: Mårten Ericson, Luleå (SE); Sara Landström, Luleå (SE); Magnus Thurfjell, Luleå (SE); Stefan Wänstedt, Luleå (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 318 days.

(21) Appl. No.: 13/501,766

(22) PCT Filed: Nov. 2, 2009

(86) PCT No.: PCT/SE2009/051236
§ 371 (c)(1),
(2), (4) Date: Apr. 13, 2012

(87) PCT Pub. No.: WO2011/053206
PCT Pub. Date: May 5, 2011

(65) Prior Publication Data
US 2012/0202513 A1     Aug. 9, 2012

(51) Int. Cl.
*H04W 72/00*     (2009.01)
*H04W 4/00*     (2009.01)
*H04W 72/10*     (2009.01)
*H04L 5/00*     (2006.01)

(52) U.S. Cl.
CPC ............ *H04W 72/10* (2013.01); *H04L 5/0007* (2013.01); *H04L 5/0064* (2013.01); *H04L 5/0053* (2013.01)
USPC ................... 455/452.2; 455/450; 455/452.1; 370/328; 370/329

(58) Field of Classification Search
CPC ... H04L 5/0007; H04L 5/0053; H04L 5/0064; H04W 72/10

USPC ............ 455/452.2, 452.1, 450; 370/328, 329
See application file for complete search history.

(56) References Cited

U.S. PATENT DOCUMENTS

2009/0247178 A1    10/2009  Lunden et al.
2011/0038341 A1*    2/2011  Norlund et al. ............... 370/329

FOREIGN PATENT DOCUMENTS

| WO | 2008/157692 A2 | 12/2008 |
| WO | 2009/118703 A1 | 10/2009 |
| WO | 2009/118704 A1 | 10/2009 |
| WO | 2010/049003 A1 | 5/2010 |
| WO | 2010/049007 A1 | 5/2010 |

OTHER PUBLICATIONS

International Search Report issued in corresponding International application No. PCT/SE2009/051236, mailed Jul. 26, 2010.

* cited by examiner

*Primary Examiner* — Opiribo Georgewill
(74) *Attorney, Agent, or Firm* — Patent Portfolio Builders PLLC

(57) ABSTRACT

Method and arrangement in base station for allocating control elements in a message comprising a predetermined number of control elements, to user equipments to be scheduled. Each user equipment is associated with a priority value, is adapted to communicate with the base station over a radio link and requires a certain number of control elements, depending on the link quality of the radio link. The method comprising sorting user equipments in a scheduling priority list and associating control elements with user equipments by selecting user equipments from the scheduling priority list and summing up the total amount of required control elements by adding the required number of control elements of each user equipment respectively, until the predetermined number of control elements in the message is reached, if two or more user equipments have been associated with the same control elements, the control elements are re-associated between the user equipments.

13 Claims, 6 Drawing Sheets

METHOD AND ARRANGEMENT IN A WIRELESS COMMUNICATION SYSTEM

TECHNICAL FIELD

The present invention relates to a method and arrangement in a base station in a wireless communication system and, more in particular, to a mechanism for allocating control elements to user equipments within the wireless communication system.

BACKGROUND

The Long Term Evolution (LTE) Physical Downlink Control Channel (PDCCH) is used for transmitting scheduling grants, to grant uplink transmissions, and downlink assignments, to inform a User Equipment (UE) where and how the downlink data is transmitted. These messages are unique for each subframe (1 ms) in LTE.

In the present context, the expression "downlink" is used to specify the transmission of wireless signals from the base station, which also may be referred to as an eNodeB or eNB, to the user equipment, while the expression "uplink" is used to denote the transmission from the user equipment to the base station.

The resources available for PDCCH are limited and more resources are consumed by a message if the corresponding downlink quality is bad.

In LTE there is also a limitation in that each user only monitors parts of the available PDCCH resources, so called "search space limitation". This means additional restrictions in the PDCCH resource allocation.

Thus, all in all, for scenarios when there are many mobiles to schedule, the number of available PDCCH:s each Transmission Time Interval (TTI) may be a bottleneck, and thus limiting the cell capacity.

A PDCCH message can be transmitted using 1, 2, 4 or 8 control elements, such as e.g. Control Channel Elements CCEs. The number of CCE:s needed to transmit a message depends primarily on the link quality. The total number of CCE:s available for PDCCH in each sub-frame is defined mainly by the carrier bandwidth and the number of Orthogonal frequency-division multiplexing (OFDM) symbols, dynamically configured for PDCCH.

The number of CCEs used for transmission of a particular PDCCH is determined by the base station according to the channel conditions. If the PDCCH is intended for a user equipment with a good downlink channel, i.e. situated close to the base station, then one CCE may be sufficient. However, for a user equipment with poor channel condition e.g. situated near the cell border, then eight CCEs may be required in order to achieve sufficient robustness. In addition, the power level of a PDCCH may be adjusted to match the channel conditions.

Scenarios where PDCCH may limit the capacity of the wireless communication system comprise many simultaneous users transmitting small packets, which may be the case e.g. in Voice over Internet Protocol (VoIP). An example of a scenario where PDCCH limitation is likely is a voice-only scenario with high load i.e. many users.

One possible method to combat the PDCCH limitation for VoIP is to use Semi-Persistent Scheduling (SPS), where one single PDCCH message can be used for allocating data resources with a predefined repetition pattern in time.

When using semi-persistent scheduling for VoIP, a periodic downlink transmission resource is allocated during a talk-spurt on the downlink. The same resource is allocated each time with a given periodicity. The allocation is turned on during each of the talk-spurts and off between talk-spurts, i.e. in silence. Thereby, explicit signalling to request an allocation and to grant a particular VoIP allocation is not required during talk-spurts. Semi-persistent scheduling for uplink VoIP communications from a user equipment is similar.

However, semi-persistent scheduling still needs to use PDCCH resources to signal the semi-persistent allocation, release it, change modulation and coding, increase or decrease the number of resources blocks to be used, or move the allocation. There is also often a need for explicit PDCCH messages for re-transmissions due to collisions with semi-persistent scheduling allocations. Furthermore, efficient use of Disrupted Transmission (DTX) periods must be explicitly signalled. Thus, efficient usage of PDCCH resources is important both for dynamic and semi-persistent scheduling.

SUMMARY

It is the object to obviate at least some of the above disadvantages and provide an improved performance within a wireless communication system.

According to a first aspect, the object is achieved by a method in a base station. The method aims at allocating control elements in a message comprising a predetermined number of control elements, to user equipments to be scheduled. Each user equipment is associated with a priority value. Also, each user equipment is adapted to communicate with the base station over a radio link. In addition, each user equipment requires a certain number of control elements, depending on the link quality of the radio link. The method comprises sorting user equipments to be scheduled in a scheduling priority list, based on the priority value of each respective user equipment. Also, the method comprises associating control elements in the message with user equipments by selecting user equipments from the scheduling priority list in priority order, one by one and summing up the total amount of required control elements by adding the required number of control elements of each selected user equipment respectively, until the predetermined number of control elements in the message is reached or if there are no more resource blocks left for transmitting data. If two or more user equipments have been associated with the same control elements, the control elements are re-associated between the user equipments. Additionally, the method also comprises allocating the associated control elements in the message to the selected user equipments.

According to a second aspect, the object is also achieved by an arrangement in a base station. The arrangement aims at allocating control elements in a message comprising a predetermined number of control elements, to user equipments to be scheduled. Each user equipment is associated with a priority value. Also, each user equipment is adapted to communicate with the base station over a radio link. In addition, each user equipment requires a certain number of control elements, depending on the link quality of the radio link. The arrangement comprises a sorting unit. The sorting unit is adapted to sort user equipments to be scheduled in a scheduling priority list, based on the priority value of each respective user equipment. Also, the arrangement comprises an associating unit. The associating unit is adapted to associate control elements in the message with user equipments by selecting user equipments from the scheduling priority list in priority order, one by one and summing up the total amount of required control elements by adding the required number of control elements of each selected user equipment respectively, until the predetermined number of control elements in the message is reached or if there are no more resource blocks left for transmitting data. Further, the arrangement comprises a re-associating unit. The re-associating unit is adapted to re-associate the associated control elements between the user equipments if two or more user equipments have been associated with the same control elements. Additionally, the arrangement also comprises an allocating unit. The allocating unit is adapted to allocate the associated control elements in the message to the selected user equipments.

By the present method and arrangement, user equipment that require a large number of control elements, or CCEs, are postponed to a later occasion when the quality might be better and fewer resources have to be spent.

At the same time user equipment with currently good channel quality get the opportunity to transmit while the quality is still good.

Further, this solution is not limited to VoIP but may be used to improve resource usage of other services as well. Thereby an improved performance in a communication system is provided.

Other objects, advantages and novel features of the invention will become apparent from the following detailed description of the invention.

BRIEF DESCRIPTION OF THE DRAWINGS

The present invention will now be described more in detail in relation to the enclosed drawings, in which.

DETAILED DESCRIPTION

The invention is defined as a method and an arrangement in a base station, which may be put into practice in the embodiments described below. This invention may, however, be embodied in many different forms and should not be construed as limited to the embodiments set forth herein; rather, these embodiments are provided so that this disclosure will be thorough and complete, and will fully convey the scope of the invention to those skilled in the art. It should be understood that there is no intent to limit the present methods and/or arrangements to any of the particular forms disclosed, but on the contrary, the present methods and arrangements are to cover all modifications, equivalents, and alternatives falling within the scope of the invention as defined by the claims.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

Figure 1:
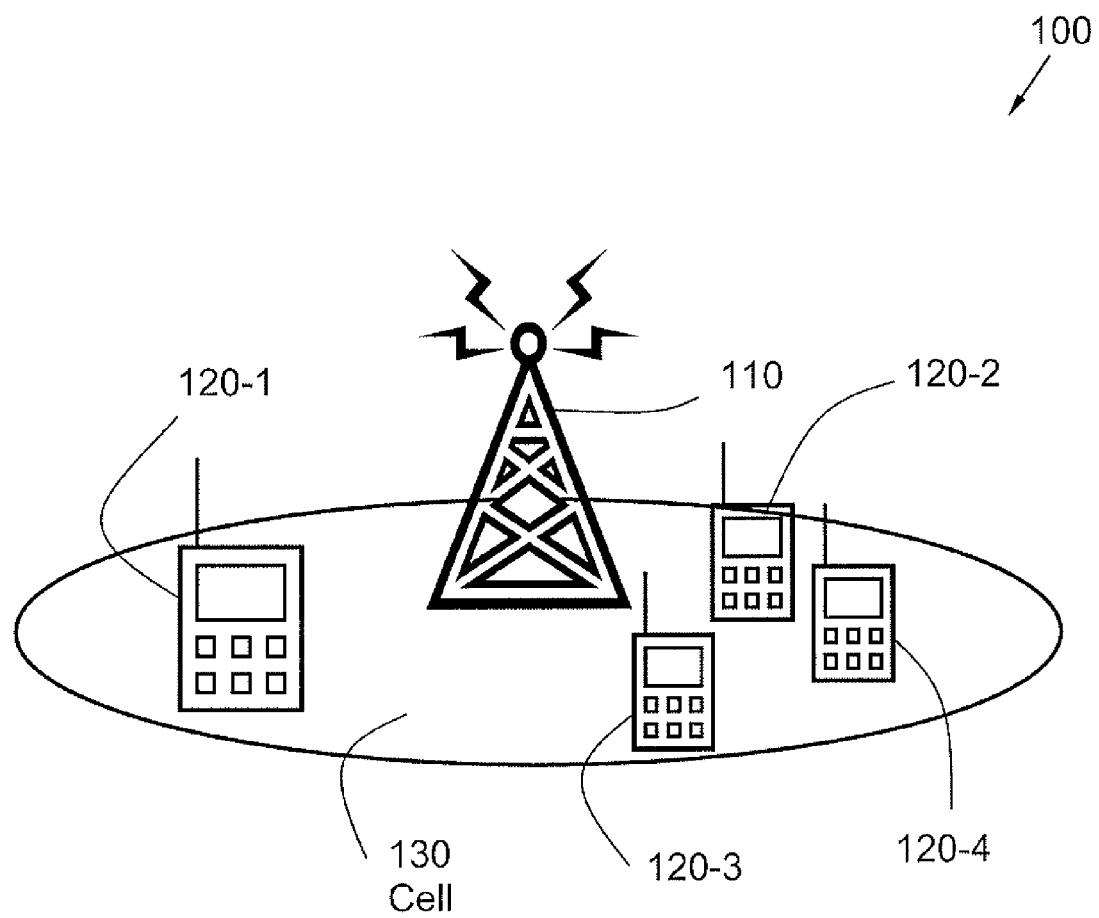
FIG. 1 is a schematic block diagram illustrating a wireless communication system.

FIG. 1 is a schematic illustration over an exemplary wireless communication network 100, wherein the present method and arrangement may be performed. The wireless communication network 100 comprises at least one base station 110 and is arranged to comprise a number of user equipments 120-1, 120-2, 120-3, 120-4. The base station 110 may send and receive wireless signals to and from the user equipments 120-1, 120-2, 120-3, 120-4 situated within the cell 130.

Although only one base station 110 is shown in FIG. 1, it is to be understood that another configuration of base station transceivers may be connected through, for example, a mobile switching centre and other network nodes, to define the wireless communication network 100. Further, the base station 110 may be referred to as e.g. a Remote Radio Unit, an access point, a Node B, an evolved Node B (eNode B) and/or a base transceiver station, a Radio Base Station (RBS), Access Point Base Station, base station router, etc depending e.g. of the radio access technology and terminology used.

In some embodiments, the user equipments 120-1, 120-2, 120-3, 120-4 may be represented by a wireless communication device, a wireless communication terminal, a mobile cellular telephone, a Personal Communications Systems terminal, a Personal Digital Assistant (PDA), a laptop, a terminal, computer or any other kind of device capable of managing radio resources. The user equipments 120-1, 120-2, 120-3, 120-4 are further adapted to communicate wirelessly between each other and the base station 110, as well as with other nodes, not shown in FIG. 1, via the base station 110 comprised within the wireless communication network 100.

The wireless communication network 100 may be based on technologies such as e.g. Long Time Evolution (LTE), Global System for Mobile Telecommunications (GSM), Enhanced Data rates for GSM Evolution (EDGE), General Packet Radio Service (GPRS), Code Division Multiple Access (COMA), Wideband Code Division Multiple Access (WCDMA), CDMA 2000, High Speed Downlink Packet Data Access (HSDPA), High Speed Uplink Packet Data Access (HSUPA), High Data Rate (HDR) High Speed Packet Data Access (HSPA), Universal Mobile Telecommunications System (UMTS), Wireless Local Area Networks (WLAN), such as Wireless Fidelity (WiFi) and Worldwide Interoperability for Microwave Access (WiMAX), Bluetooth or any other wireless communication technology etc, just to mention some few arbitrary and none limiting examples.

However, in the subsequent exemplary embodiments, the present method and arrangement are described in an Evolved Universal Terrestrial Radio Access (E-UTRA) environment.

It is to be noted however, that the present solution is not in any way limited to be performed exclusively over a radio interface within the wireless communication network 100, but may be performed within a wireless communication network 100 where some nodes are wirelessly connected and some nodes have a wired connection.

The wireless communication network 100 may, according to some particular, non limiting embodiments be adapted to provide a variety of services to the user equipment 120 such as e.g. Voice over IP (VoIP).

The base station 110 is further adapted to schedule the uplink transmissions from the user equipment 120, to the base station 110. In order to grant a particular user equipment 120 access to a particular uplink resource, a message comprising control elements, such as e.g. Control Channel Elements CCE, is sent from the base station 110 to the user equipment 120, e.g. over a PDCCH channel, as will be further explained more in detail in connection with FIGS. 2*a*-*c* and 3*a*-*b*.

The present method and arrangement increases the number of possible PDCCHs per TTI, thus increasing the number of user equipments 120 that can be scheduled each TTI. The present method and arrangement takes advantage of the fact that the LTE sub-frame time-scale is relatively short compared to many delay sensitive services like e.g. VoIP. Thus, it is possible to reshuffle the normal scheduling priority list, so that the PDCCHs resources are utilized in the most efficient way. Note that services that are less delay sensitive than VoIP will potentially have more time to further optimize the PDCCHs per TTI.

When choosing which user equipment 120 to send assignments or grants to, the priority value e.g. based on urgency due to delay requirement may be taken into account and a preliminary allocation on the available set of control elements, e.g. CCEs may be made.

The invention iteratively replace user equipments 120 requiring many control elements or if control elements are unused due to "search space limitation" with other user equipments 120 that require less, or can use the unused control elements, and thereby increase the total number of messages until the target number of PDCCH to use each TTI is reached or if there are no more resource blocks left for transmitting data.

The present method and arrangement may improve PDCCH capacity for most services. For simplicity, as VoIP is a fairly well-behaved service; packets arriving at a fixed rate and since VoIP capacity may be limited by PDCCH capacity, the following non limiting embodiment comprises VoIP: If there are 30 user equipments 120 using VoIP eligible for scheduling and the target number is to schedule 5 user equipments 120 each TTI with 8 control elements available.

Initially, the user equipments 120 are selected in priority order and are allocated the required number of control elements until no more control elements are available for that TTI. If the required number of control elements is equal to the available number of control elements after this first allocation round, no rescheduling is needed. However, this could not always be expected to be the case.

Figure 2A:
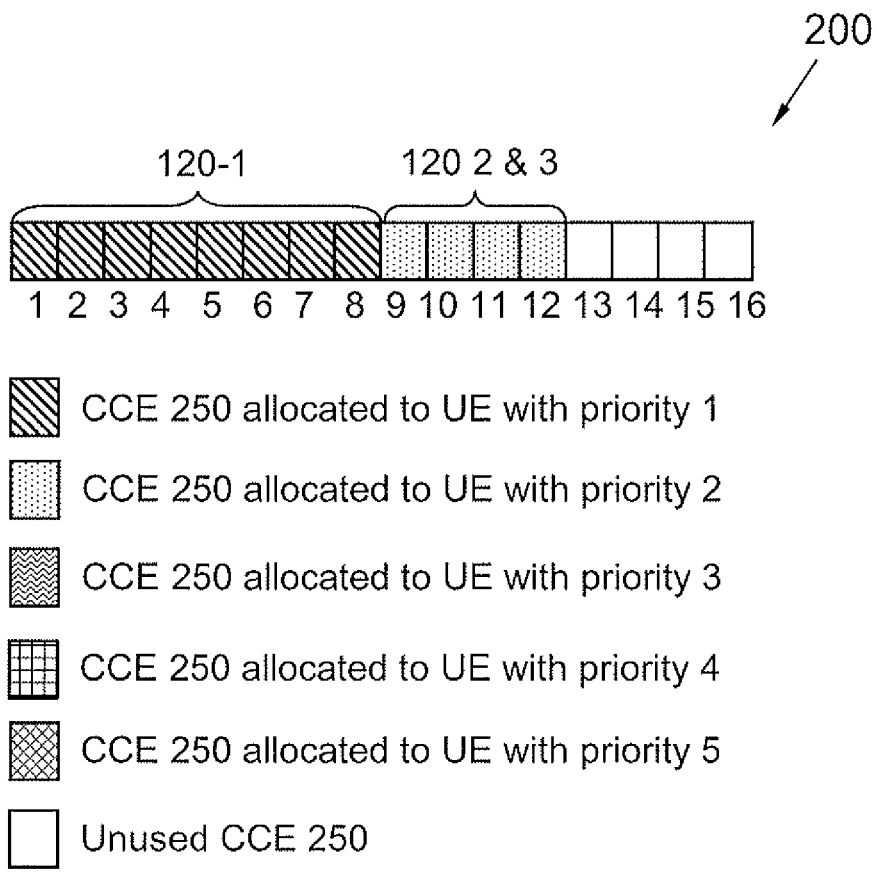
FIG. 2a is a schematic block diagram illustrating a message comprising control elements, according to some embodiments.

FIG. 2*a* is a schematic block diagram illustrating a message 200 comprising control elements 250, according to some embodiments.

In the illustrated example, the user equipment 120-2 and user equipment 120-3 "collide", i.e. they can only use the same control elements 250 due to their search space limitation. Thus the user equipment 120-2 and user equipment 120-3 require the same control elements 250, while there are unused control elements 250 for that TTI. However, none of the user equipment 120-2 and/or user equipment 120-3 are able to use these unused control elements 250.

Figure 2B:
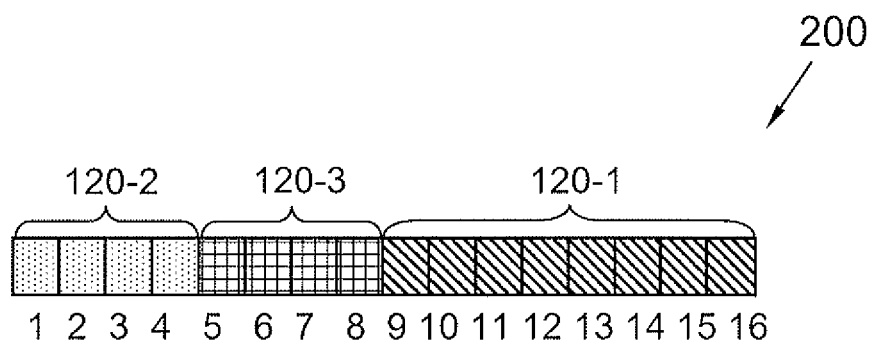
FIG. 2b is a schematic block diagram illustrating a message comprising control elements, according to some embodiments.

According to some embodiments, as illustrated in FIG. 2*b*, the selected user equipments 120-1, 120-2 and 120-3 with the highest priorities are still selected, but the control elements 250 are re-allocated between them, such that all control elements 250 in that TTI may be utilized.

Figure 2C:
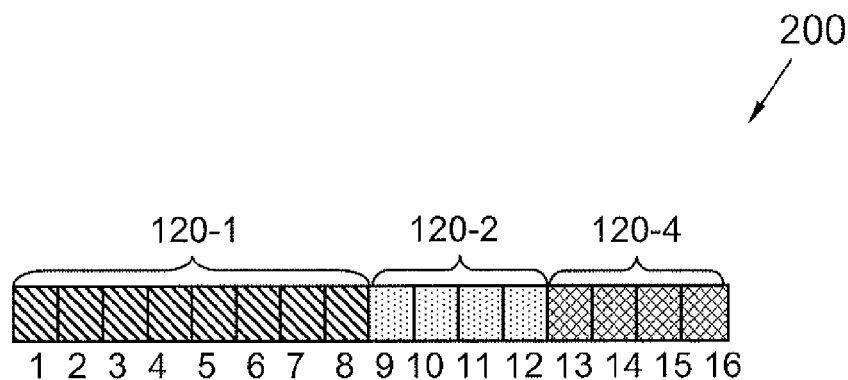
FIG. 2c is a schematic block diagram illustrating a message comprising control elements, according to some embodiments.

According to some embodiments, as illustrated in FIG. 2*c*, one of the colliding user equipments 120-3 may be replaced with a previously unselected user equipment 120-4 with lower priority, that is able to use the previously unused control elements 250.

Figure 3A:
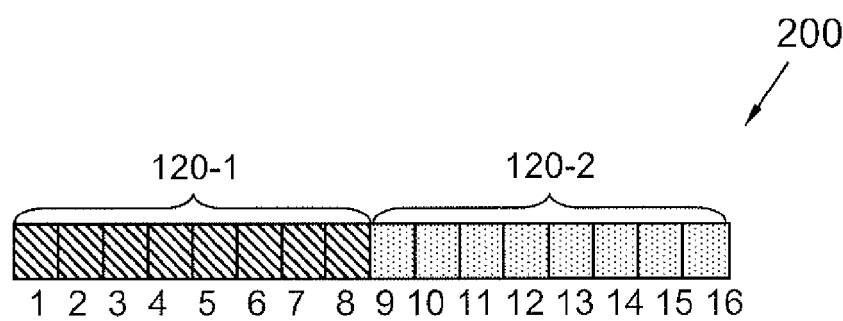
FIG. 3a is a schematic block diagram illustrating a message comprising control elements, according to some embodiments.

FIG. 3*a* illustrates an example wherein only two user equipments 120-1, 120-2 are selected in the message 200 for that TTI. The number of two user equipments 120-1, 120-2 may be lower than a certain predetermined threshold value.

Figure 3B:
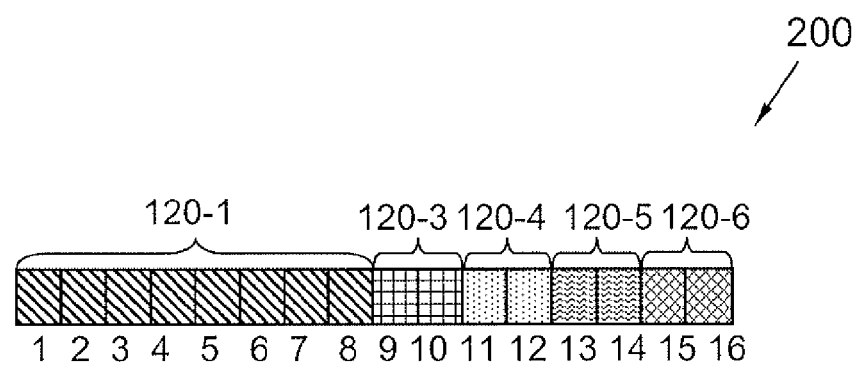
FIG. 3b is a schematic block diagram illustrating a message comprising control elements, according to some embodiments.

According to some embodiments, as illustrated in FIG. 3*b*, one user equipment 120-2 may be replaced with a plurality of user equipments 120-3, 120-4, 120-5, 120-6 with lower priority than the removed user equipment 120-2.

The present method, of which some embodiments are illustrated in FIGS. 2*a*-2*c* and FIGS. 3*a*-3*b* may according to some embodiments be described in the following way:

It may be assumed that x number of control elements 250 exist.

While the number of scheduled users for a particular TTI is less than a predetermined threshold value, and the priority value exceeds a priority threshold value: an attempt may be made to reshuffle control elements 250 between already scheduled user equipments 120, to overcome the "search space limitation", if any.

The check if the priority value exceeds the priority threshold value may be performed in order to avoid that a user equipment 120 with too low priority value is scheduled instead of a high priority user equipment 120.

Further, if user equipments 120 still use the same search space, i.e. a control element collision occur, the colliding user equipment 120 with lowest priority value in the UE priority list may be replaced with another user equipment 120 with next lowest priority value, user equipment 120-4 in the example illustrated in FIG. 2*c* and see if that user equipment 120 can use the unused control elements 250 in the message 200.

Further, in addition, the number of grants transmitted this TTI so far may be calculated. While the calculated number of grants this TTI is less than the corresponding grant target threshold value and the priority level is above the preset priority threshold limit value, the following method step may be performed, according to some embodiments.

The scheduled user equipment 120 with the lowest priority value, and with a control element usage bigger than a threshold value X may be removed and replace with the user equipment 120 with next lowest priority value, user equipment 120-4 in the example illustrated in FIG. 2*c*, if the control element usage is lower than the threshold value X, according to some embodiments.

The user equipment 120 that has been removed during any previous step may optionally get an increased priority value for the next TTI.

Figure 4A:
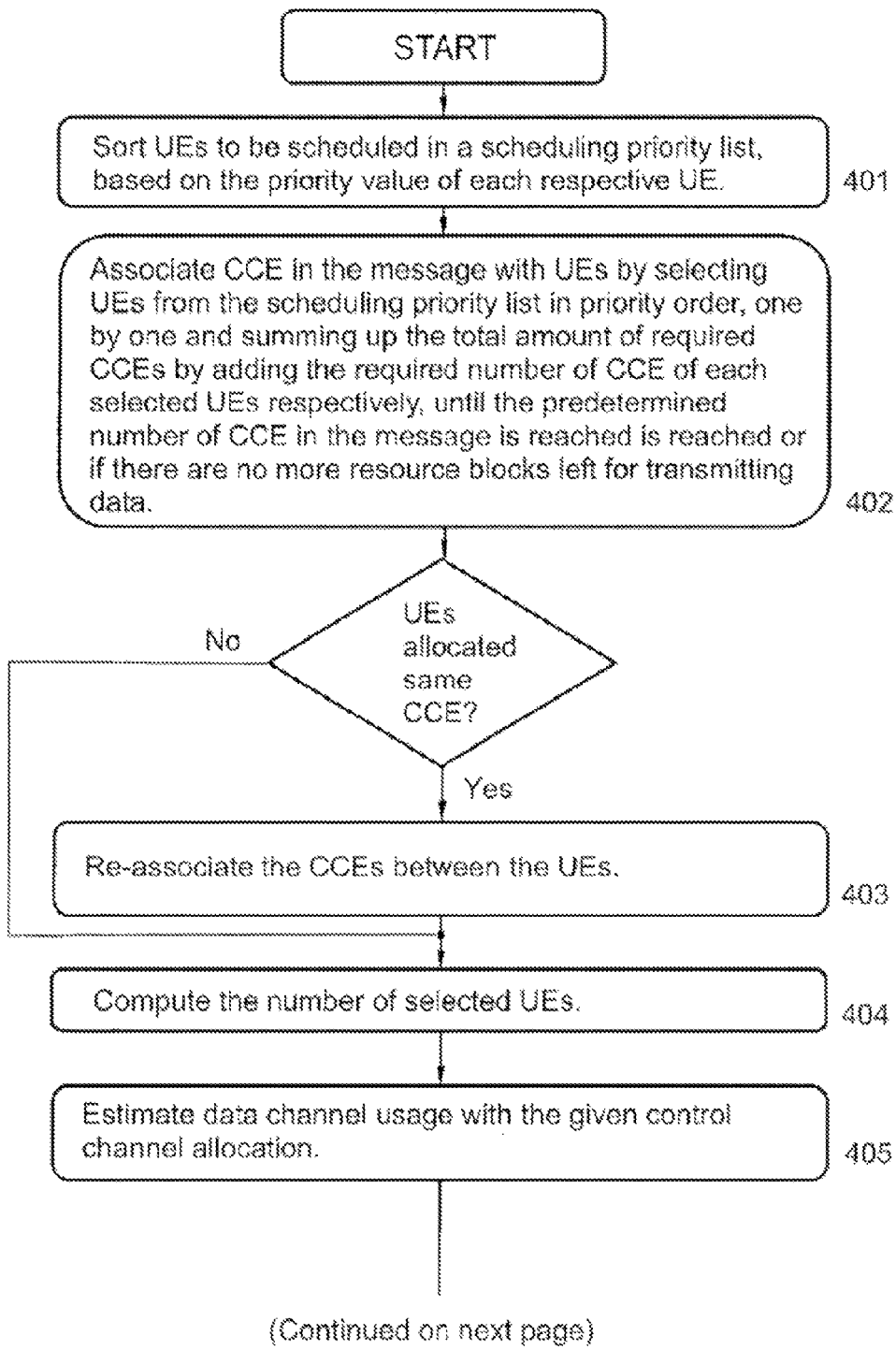
FIG. 4a is the first half of a flow chart illustrating embodiments of method steps in a base station.
Figure 4B:
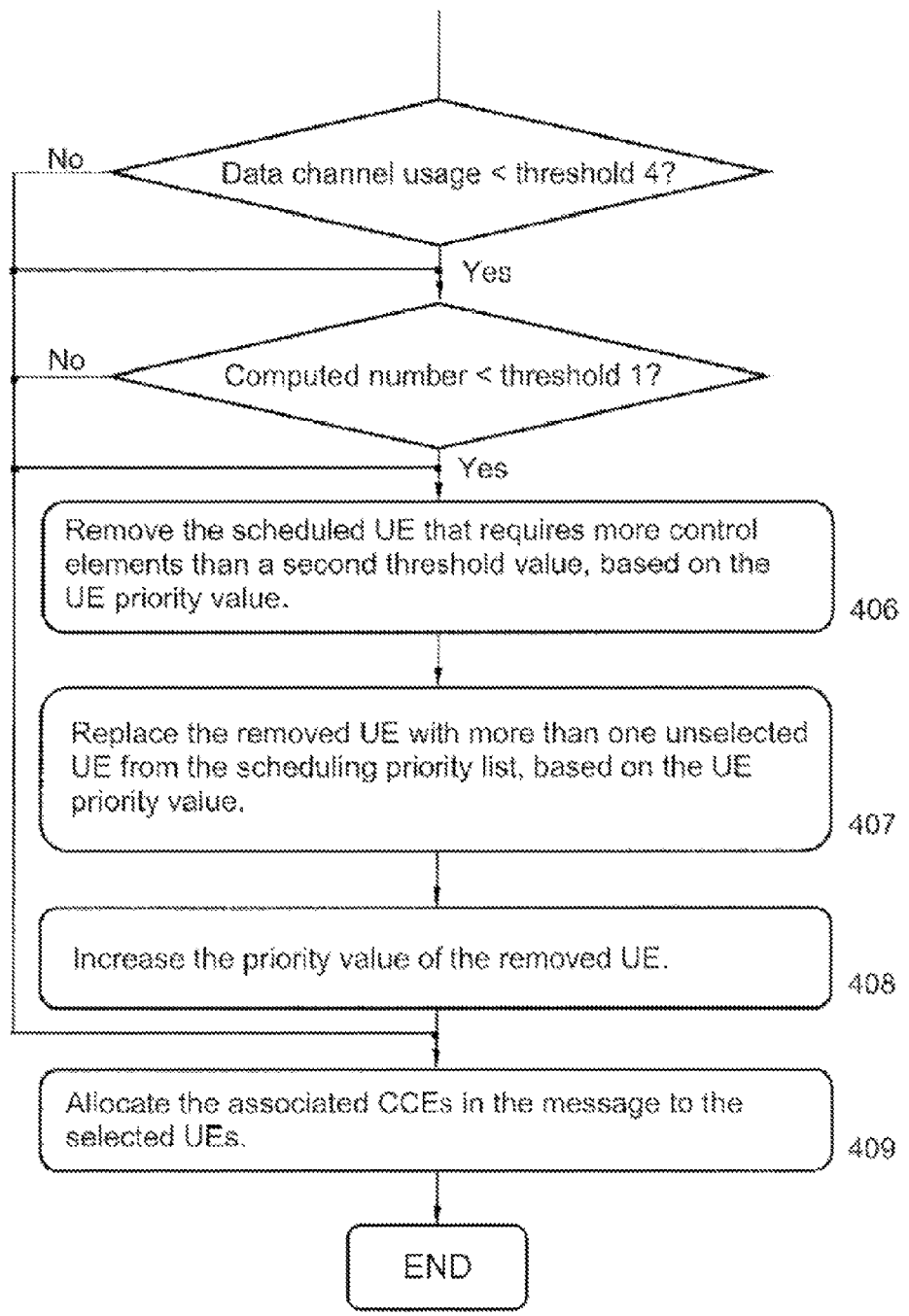
FIG. 4b is the second half of a flow chart illustrating embodiments of method steps in a base station.

FIGS. 4*a* and 4*b* is a flow chart illustrating embodiments of method steps 401-408 performed in a base station 110. The method aims at allocating control elements 250 in a message 200, to user equipments 120 to be scheduled. The control elements 250 may be e.g. Control Channel Elements CCE. The message 200 is adapted to comprise a predetermined number of control elements 250. The message 200 may be sent over a Physical Downlink Control Channel (PDCCH), according to some embodiments. The message 200 may be a grant for granting uplink transmissions to user equipments 120 that has data to transmit according to some embodiments. However, the message 200 may optionally be an assignment for informing user equipments 120 how downlink data is to be received. The base station 110 and the user equipments 120 are comprised within a wireless communication system 100. Each user equipment 120 is associated with a priority value. Also, each user equipment 120 is adapted to communicate with the base station 110 over a radio link. Each user equipment 120 requires a certain number of control elements 250, depending on the link quality of the radio link. The method may provide a service such as e.g. VoIP, just to mention an example.

To appropriately allocate the control elements 250, the method may comprise a number of method steps 401-409.

It is however to be noted that some of the method steps 401-409 are optional and may only be performed within some embodiments. Further, the method steps 401-409 may be performed in a somewhat different chronological order than indicated by the enumerated order. Some of the method steps, e.g. step 407 and step 408, or even all steps 401-409 may be performed simultaneously, or in a different chronological order, according to some embodiments. The method may comprise the following steps:

Step 401

User equipments 120 to be scheduled are sorted in a scheduling priority list, based on the priority value of each respective user equipment 120. Thus the user equipment 120 with the highest priority value may be sorted first in the scheduling priority list, the user equipment 120 with the second highest priority value may be sorted secondly etc Step 402

Control elements 250 in the message 200 are associated with user equipments 120 by selecting user equipments 120 from the scheduling priority list in priority order. Thus user equipments 120 are selected based on their priority value. Thus the user equipment 120 with the highest priority value is selected firstly; the user equipment 120 with the second highest priority value is selected secondly etc. The user equipment 120 are selected one by one and the total amount of required control elements 250 is summed up by addition of the required number of control elements 250 of each selected user equipment 120 respectively, until the predetermined number of control elements 250 in the message 200 is reached, or until there are no more resource blocks left for transmitting data.

According to some embodiments, the control elements 250 within the message 250 may be enumerated. Thus the step of associating control elements 250 with user equipments 120 may further be performed such that control elements 250 may be associated in enumeration order to each respective selected user equipment 120, which in turn is selected based on the priority value of the user equipment 120.

Step 403

If two or more user equipments 120 have been allocated the same control elements 250, these control elements 250 are re-associated between the user equipments 120.

The control elements 250 may be re-associated between user equipments 120, according to some embodiments, by reshuffling the control elements 250 between the selected user equipments 120.

According to some embodiments, the re-association of the control elements 250 between user equipments 120 comprises replacing one of the two or more user equipments 120 that have been associated with the same control elements 250, based on said priority value, with the highest prioritized, unselected user equipment 120 from the scheduling priority list.

According to the latter arrangement, if e.g. two user equipments 120 have been associated with the same control elements 250, the one of the two user equipments 120, that has the lowest priority value may be replaced with the unselected user equipment 120 that has the highest priority value of the unselected user equipments 120 in the scheduling priority list.

Step 404

This step is optional and may only be performed within some embodiments.

The number of selected user equipments 120 may be computed. Thus the number of user equipments 120 that are selected in the message 200 each TTI may be computed, according to some embodiments.

Step 405

This step is optional and may only be performed within some embodiments.

The uplink and downlink data channel usage with the given control channel allocation may be estimated.

Step 406

This step is optional and may only be performed within some embodiments.

If the computed, in step 404, number of selected user equipments 120 is lower than a first threshold value, a selected user equipment 120 that requires more control elements 250 than a second threshold value may be removed, based on the priority value of the user equipments 120.

For example, if only two user equipments 120 are selected while the first threshold value has been preset to e.g. three, the one of the selected user equipments 120 that requires more control elements 250 than a second threshold value, which may be preset to e.g. 4, just as an example, may be removed.

Thereby, the number of user equipments 120 that may be selected and thereby also scheduled for each TTI may be increased, by removing user equipment 120 with bad radio conditions and replacing them with user equipments 120 having good, or at least better, radio conditions.

If all user equipments 120 with more control elements 250 than the second threshold value have a UE priority value higher than a third threshold value, no user equipments 120 is removed to guarantee that user equipments 120 may get scheduled, even if it requires many control elements 250, according to some embodiments.

If all data resources are used, the number of scheduled users is not increased, according to some embodiments.

However, according to some embodiments, the step of removing the user equipment 120 may be performed if the estimated 405 data channel usage is lower than a fourth threshold value.

According to yet some embodiments, the step of removing the user equipment 120 may be performed if the estimated 405 data channel usage is lower than a fourth threshold value and if the computed, in step 404, number of selected user equipments 120 is lower than a first threshold value.

Step 407

This step is optional and may only be performed within some embodiments.

The removed user equipment 120, in step 406, if any, may be replaced with more than one unselected user equipment 120 from the scheduling priority list, based on the priority value associated with the user equipment 120. Thus the removed user equipment 120 may be replaced with the two or more unselected user equipments 120 that have the highest priority values among the non-selected user equipments 120 in the scheduling priority list, according to some embodiments. It may be pointed out that there is no obvious advantage in replacing one user equipment 120 with less than at least two other user equipments 120.

However, according to some embodiments, the step of replacing the user equipment 120 may be performed only if the estimated 405 data channel usage is lower than a fourth threshold value.

According to yet some embodiments, the step of replacing the removed user equipment 120 may be performed if the estimated 405 data channel usage is lower than a fourth threshold value and if the computed, in step 404, number of selected user equipments 120 is lower than a first threshold value.

Step 408

This step is optional and may only be performed within some embodiments.

The priority value of the removed user equipment 120 may be increased, according to some embodiments.

By increasing the priority value of the removed user equipment 120, it may be avoided that a particular user equipment 120 is never selected, or not selected within a time frame that is meaningful for the provided service. The time frame may be determined by the priority function and the third threshold value, which prevents the user equipment 120 from being removed if it requires more control elements 250 than the second threshold value.

Step 409

The associated control elements 250 in the message 200 are allocated to the selected user equipments 120. The required number of control elements 250 are allocated to each user equipment 120 respectively, based on the respective link quality of each respective user equipment 120.

Figure 5:
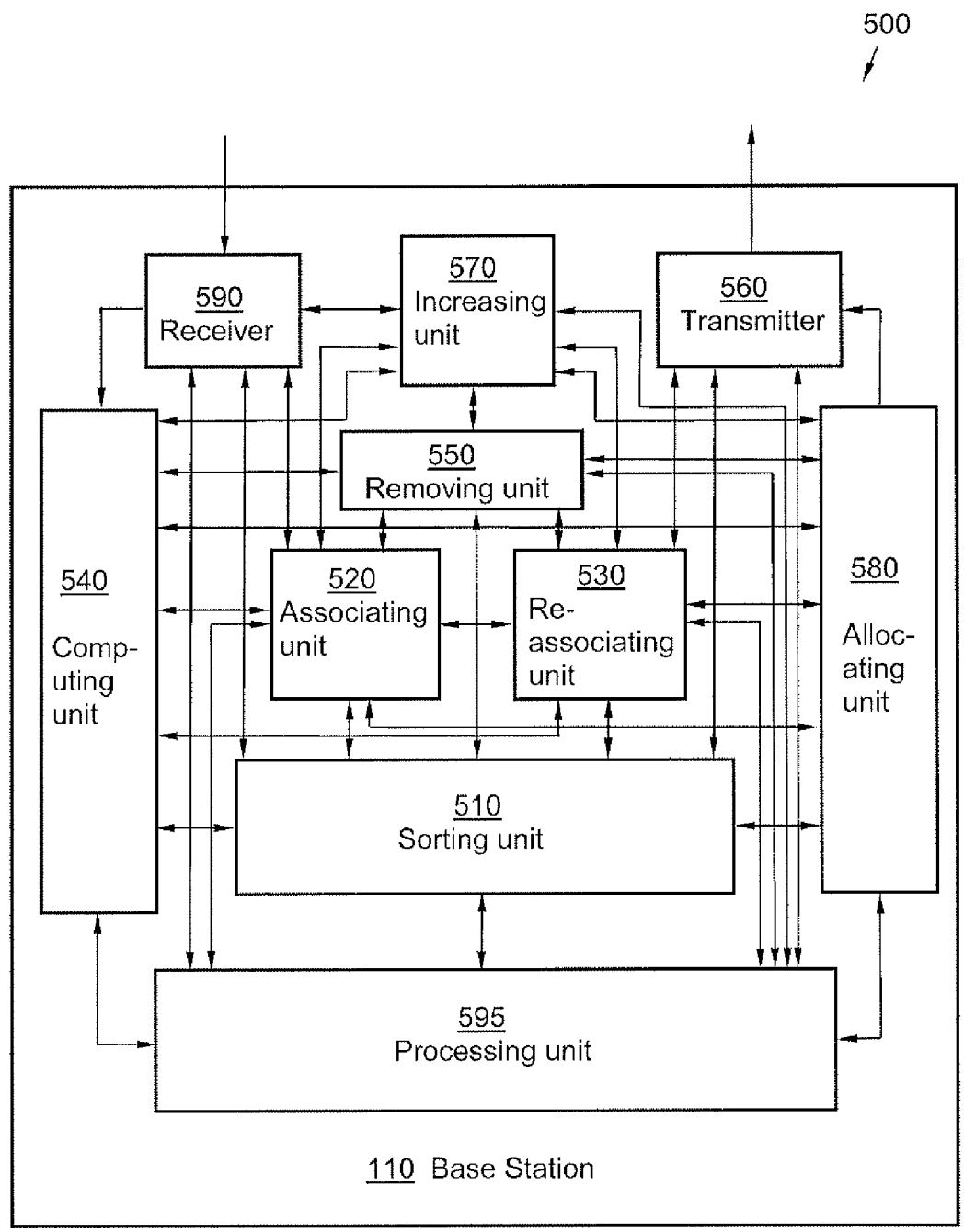
FIG. 5 is a block diagram illustrating embodiments of an arrangement in a base station.

FIG. 5 is a block diagram illustrating embodiments of an arrangement 500 situated in a base station 110. The arrangement 500 is configured to perform the method steps 401-409 for allocating control elements 250 in a message 200, to user equipments 120 to be scheduled. The control elements 250 may be e.g. Control Channel Elements CCE. The message 200 is adapted to comprise a predetermined number of control elements 250. The message 200 may be sent over a Physical Downlink Control Channel (PDCCH), according to some embodiments. The message 200 may be a grant for granting uplink transmissions to user equipments 120 that has data to transmit according to some embodiments. However, the message 200 may optionally be an assignment for informing user equipments 120 how downlink data is to be received. The base station 110 and the user equipments 120 are comprised within a wireless communication system 100. Each user equipment 120 is associated with a priority value. Also, each user equipment 120 is adapted to communicate with the base station 110 over a radio link. Each user equipment 120 requires a certain number of control elements 250, depending on the link quality of the radio link. A service such as e.g. VoIP, just to mention an example, may be provided.

For the sake of clarity, any internal electronics of the arrangement 500, not completely necessary for understanding the present solution has been omitted from FIG. 5.

The arrangement 500 comprises a sorting unit 510. The sorting unit 510 is adapted to sort user equipments 120 to be scheduled in a scheduling priority list, based on the priority value of each respective user equipment 120. Also, the arrangement 500 comprises an associating unit 520. The associating unit 520 is adapted to associate control elements 250 in the message 200 with user equipments 120. The association is made by selecting user equipments 120 from the scheduling priority list in priority order, one by one and summing up the total amount of required control elements 250 by adding the required number of control elements 250 of each selected user equipment 120 respectively, until the predetermined number of control elements 250 in the message 200 is reached or until there are no more resource blocks left for transmitting data. Further, the arrangement 500 comprises a re-associating unit 530. The re-associating unit 530 is adapted to re-associate the associated control elements 250 between the user equipments 120, if two or more user equipments 120 have been associated with the same control elements 250. In addition, the arrangement 500 comprises an allocating unit 580. The allocating unit 580 is adapted to allocate the associated control elements 250 in the message 200 to the selected user equipments 120.

The arrangement 500 may further comprise a computing unit 540. The computing unit 540 is adapted to compute the number of selected user equipments 120 in the message 200. Additionally, the arrangement 500 may also comprise a removing unit 550. The removing unit 550 is adapted to remove the selected user equipment 120 that requires more control elements 250 than a second threshold value, based on said priority value. The removing unit 550 is further adapted to replace the removed user equipment 120 with more than one unselected user equipments 120 from the scheduling priority list, based on the priority value.

In addition, the arrangement 500 may comprise a transmitter 560. The transmitter 560 may be adapted to send the message 200 to the user equipments 120. In further addition, the arrangement 500 may also comprise an increasing unit 570. The increasing unit 570 may be adapted to increase the priority value of the removed user equipment 120. The arrangement 500 may further comprise a receiving unit 590. The receiving unit 590 may be adapted to receive radio signals, e.g. sent from the user equipments 120.

The arrangement 500 may according to some embodiments further comprise a processing unit 595. The processing unit 595 may be represented by e.g. a Central Processing Unit (CPU), a processor, a microprocessor, or other processing logic that may interpret and execute instructions. The processor unit 595 may perform all data processing functions for inputting, outputting, and processing of data including data buffering and device control functions, such as call processing control, user interface control, or the like.

It is to be noted that the described units 510-595 comprised within the arrangement 500 may be regarded as separate logical entities, but not with necessity as separate physical entities. Any, some or all of the units 510-595 may be comprised or co-arranged within the same physical unit. However, in order to facilitate the understanding of the functionality of the arrangement 500, the comprised units 510-595 are illustrated as separate units in FIG. 5.

Thus the transmitting unit 560 and e.g. the receiving unit 590 may, according to some embodiments, be comprised within one physical unit, a transceiver, which may comprise a transmitter circuit and a receiver circuit, which respectively transmits outgoing radio frequency signals to the user equipments 120 and receives incoming radio frequency signals from the user equipments 120 via an optional antenna. The radio frequency signals transmitted between the base station 110 and the user equipment 120 may comprise both traffic and control signals e.g. paging signals/messages for incoming calls, which may be used to establish and maintain a voice call communication with another party or to transmit and/or receive data, such as SMS, e-mail or MMS messages, etc.

The method steps 401-409 in the base station 110 may be implemented by means of the one or more processing units 595 in the base station 110, together with computer program product comprising code for performing the functions of the present method steps 401-409. Thus a computer program product, comprising instructions for performing the method steps 401-409 in the base station 110 may allocate control elements 250 in a message 200, to user equipments 120 to be scheduled, when the computer program product is loaded into the processing unit 595.

The computer program product mentioned above may be provided for instance in the form of a data carrier carrying computer program code for performing the method steps according to the present solution when being loaded into the processor unit 595. The data carrier may be e.g. a hard disk, a CD ROM disc, a memory stick, an optical storage device, a magnetic storage device or any other appropriate medium such as a disk or tape that can hold machine readable data. The computer program code can furthermore be provided as program code on a server and downloaded to the base station 110 remotely, e.g. over an Internet or an intranet connection.

Further, a computer program product comprising instructions for performing at least some of the method steps 401-409 may be used for implementing the previously described method in the base station 110 for allocating control elements 250 in a message 200, to user equipments 120 to be scheduled, when the computer program product is run on a processing unit 595 comprised within the base station 110.

The terminology used in the detailed description of the particular exemplary embodiments illustrated in the accompanying drawings is not intended to be limiting of the present method and arrangement.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

The invention claimed is:

1. Method in a base station for allocating control elements in a message comprising a predetermined number of control elements, to user equipments to be scheduled, each user equipment is associated with a priority value, is adapted to communicate with the base station over a radio link and requires a certain number of control elements, depending on the link quality of the radio link, the method comprising the steps of:
    sorting user equipments to be scheduled in a scheduling priority list, based on the priority value of each respective user equipment,
    associating control elements in the message with user equipments by selecting user equipments from the scheduling priority list in priority order, one by one and summing up the total amount of required control elements by adding the required number of control elements of each selected user equipment respectively, until the predetermined number of control elements in the message is reached,
    if two or more user equipments have been associated with the same control elements, re-associate the control elements between the user equipments, and
    allocating the associated control elements in the message to the selected user equipments.

2. Method according to claim 1, wherein the control elements within the message are enumerated and the step of associating control elements with user equipments is further performed such that control elements are associated in enumeration order to each respective selected user equipment, which in turn is selected based on the priority value of the user equipment.

3. Method according to claim 1, wherein the step of re-associating the associated control elements between user equipments comprises reshuffling the associated control elements between the selected user equipments.

4. Method according to claim 1, wherein the step of re-associating the associated control elements between user equipments comprises replacing one of the two selected user equipments that has been associated with the same control elements, based on said priority value, with the most prioritized, unselected user equipment from the scheduling priority list.

5. Method according to claim 1, comprising the further step of:
    computing the number of selected user equipments.

6. Method according to claim 1, comprising the further step of:
    estimating uplink and downlink data channel usage with the given control channel allocation.

7. Method according to claim 5, comprising the further step of:
    removing a selected user equipment that requires more control elements than a second threshold value, based on said priority value, if the user equipment priority does not exceed a third threshold value, and
    replacing the removed user equipment with more than one unselected user equipment from the scheduling priority list, based on said priority value.

8. Method according to claim 7, wherein the steps of removing a selected user equipment and replacing the removed user equipment are performed only if the computed number of selected user equipments is lower than a first threshold value and/or the estimated data channel usage is lower than a fourth threshold value.

9. Method according to claim 1, comprising the further step of:
    increasing the priority value of the removed user equipment.

10. Method according to claim 1, wherein the control elements are Control Channel Elements "CCE" and the message is sent over a Physical Downlink Control Channel "PDCCH".

11. Method according to claim 1, wherein the message is a grant for granting uplink transmissions to user equipment that has data to transmit.

12. Method according to claim 1, wherein the message is an assignment for informing user equipment how downlink data is to be received.

13. Arrangement in a base station for allocating control elements in a message comprising a predetermined number of control elements, to user equipments to be scheduled, each user equipment is associated with a priority value, is adapted to communicate with the base station over a radio link and requires a certain number of control elements, depending on the link quality of the radio link, the arrangement comprising:
    a sorting unit, adapted to sort user equipments to be scheduled in a scheduling priority list, based on the priority value of each respective user equipment,
    an associating unit, adapted to associate control elements in the message with user equipments by selecting user equipments from the scheduling priority list in priority order, one by one and summing up the total amount of required control elements by adding the required number of control elements of each selected user equipment respectively, until the predetermined number of control elements in the message is reached,
    a re-associating unit, adapted to re-associate the associated control elements between the user equipments if two or more user equipments have been associated with the same control elements, and an allocating unit, adapted to allocate the associated control elements in the message to the selected user equipments.

* * * * *

UNITED STATES PATENT AND TRADEMARK OFFICE
CERTIFICATE OF CORRECTION

PATENT NO. : 8,838,130 B2
APPLICATION NO. : 13/501766
DATED : September 16, 2014
INVENTOR(S) : Ericson et al.

It is certified that error appears in the above-identified patent and that said Letters Patent is hereby corrected as shown below:

In the Specification

In Column 4, Line 42, delete "(COMA)," and insert -- (CDMA), --, therefor.

In the Claims

In Column 12, Line 65, in Claim 13, delete "user equipments if" and insert -- user equipments, if --, therefor.

Signed and Sealed this
Fourteenth Day of April, 2015

Michelle K. Lee
*Director of the United States Patent and Trademark Office*